Feb. 21, 1928.  1,660,085
I. ELNAIN NÉE NASSAU
LIQUID DISPENSING DEVICE
Filed Aug. 26, 1926
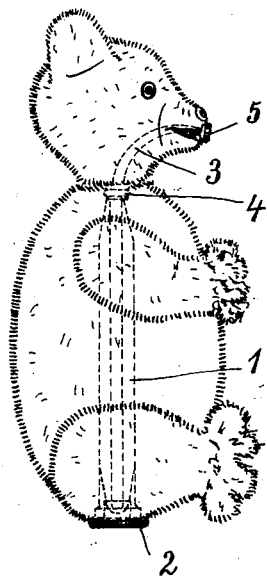
Inventor:
Ida Elnain née Nassau
by [signature]
Atty.

Patented Feb. 21, 1928.

1,660,085

UNITED STATES PATENT OFFICE.

IDA ELNAIN, NÉE NASSAU, OF BERLIN-SCHONEBERG, GERMANY.

LIQUID-DISPENSING DEVICE.

Application filed August 26, 1926, Serial No. 131,619, and in Germany June 26, 1926.

My invention refers to liquid dispensing devices and more especially to a container adapted for use in the dispensing of perfumes in a discreet manner.

The device according to the present invention consists of a preferably flat metallic or other container having flexible walls and a curved mouthpiece closed by means allowing, when turned, the ejection of some of the perfume contained in the container, the whole being enclosed in an envelope representing an animal or human body in such manner that the filling opening of the container serves as a support for the device, while the dispensing opening slightly projects from the mouth of the envelope.

In the drawing affixed to this specification and forming part thereof a device embodying my invention is illustrated diagrammatically by way of example.

Referring to the drawing, 1 is a sheet metal container having substantially the form and size of a watch. 2 is a screw cap closing the filling opening in the bottom portion of the container, this cap presenting a plain surface adapted to support the device in erect position. 3 is the curved dispensing tube fitted on the dispensing opening 4 opposite the filling opening, this tube being curved to one side and 5 is a closure of a well known kind such as used in connection with the stoppers of eau de Cologne bottles, which by being partly unscrewed allows some liquid to be expelled by shaking. The container and dispensing tube are enclosed in a reproduction of an animal's body, made of wool, silk or some other suitable material, in such manner that the screw cap 2 projects from the bottom portion and allows the device to rest thereon, while the closing means 5 projects from the mouth of the animal in such manner as to be easily handled.

Obviously, when the closure 5 is unscrewed, the perfume or other liquid contained in the container 1 can be expelled through the dispensing tube 3 by exerting pressure with two fingers on the back and belly of the animal, the interstice between the flat container and the ogival body being preferably filled with wadding or some other suitable material.

Obviously any other envelope instead of an animal's body can be substituted for same, and the watch-shaped sheet metal container can also be replaced by a container of different form and material.

I wish it to be understood that I do not desire to be limited to the exact details of construction shown and described, for obvious modifications will occur to a person skilled in the art.

I claim:—

Liquid dispensing device comprising in combination a liquid container with a yielding wall, a filling opening on one side thereof, means for closing said opening, a curved dispensing tube projecting from the other side of said container, means for closing the discharge end of said dispensing tube and an envelope in the form of an animal's body enclosing said container in such manner that said closing means for the filling opening projects from the bottom portion of and serves as a rest for said envelope, while the closing means for said dispensing tube projects from the face portion of said envelope.

In testimony whereof I affix my signature.

IDA ELNAIN, NÉE NASSAU.